United States Patent [19]

Keyser

[11] 3,776,576
[45] Dec. 4, 1973

[54] PIPE ASSEMBLY
[75] Inventor: Lewis R. Keyser, Dayton, Ohio
[73] Assignee: Price Brothers Company, Dayton, Ohio
[22] Filed: Apr. 6, 1972
[21] Appl. No.: 241,553

[52] U.S. Cl.................. 285/27, 285/288, 285/321
[51] Int. Cl............................................. F16l 49/00
[58] Field of Search.................. 285/288, 230, 321, 285/403, 309, 310, 311, 297, 294, 27; 24/279

[56] References Cited
UNITED STATES PATENTS

| 1,463,692 | 7/1923 | Hail | 285/297 |
|---|---|---|---|
| 285,179 | 9/1883 | Tibbals | 285/294 |
| 2,821,416 | 1/1958 | Soehnlen et al. | 285/297 X |
| 3,177,019 | 4/1965 | Osweiler | 285/288 |
| 2,901,269 | 8/1959 | Rickard | 285/321 X |
| 3,144,262 | 8/1964 | Reynolds | 285/311 |
| 3,606,393 | 9/1971 | Huntsinger et al. | 285/321 X |
| 3,381,983 | 5/1968 | Hanes | 285/403 X |
| 3,212,797 | 10/1965 | Osweiler | 285/288 X |
| 1,609,660 | 12/1926 | Phelps | 285/288 |
| 1,524,296 | 1/1925 | Field | 285/321 X |

FOREIGN PATENTS OR APPLICATIONS

| 20,625 | 1894 | Great Britain | 285/297 |

*Primary Examiner*—Thomas F. Callaghan
*Attorney*—Lawrence B. Biedel et al.

[57]  ABSTRACT

A pipe joint which includes a bell and spigot and a split locking ring positioned within the joint between the outer face of the spigot and the inner face of the bell. The locking ring is expanded within the bell so that the spigot may be inserted into the locking ring and the bell and the locking ring is then contracted to provide a key which bears against an inwardly projecting nose on the bell and an annular rib on the spigot, thereby resisting axial thrust forces tending to separate the bell and spigot.

8 Claims, 7 Drawing Figures

PATENTED DEC 4 1973 3,776,576

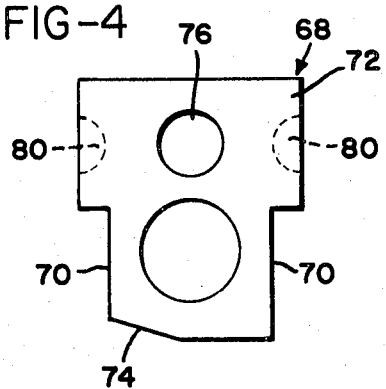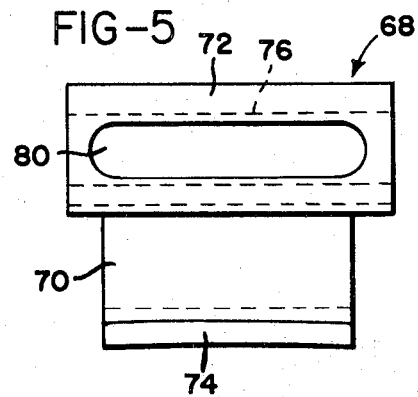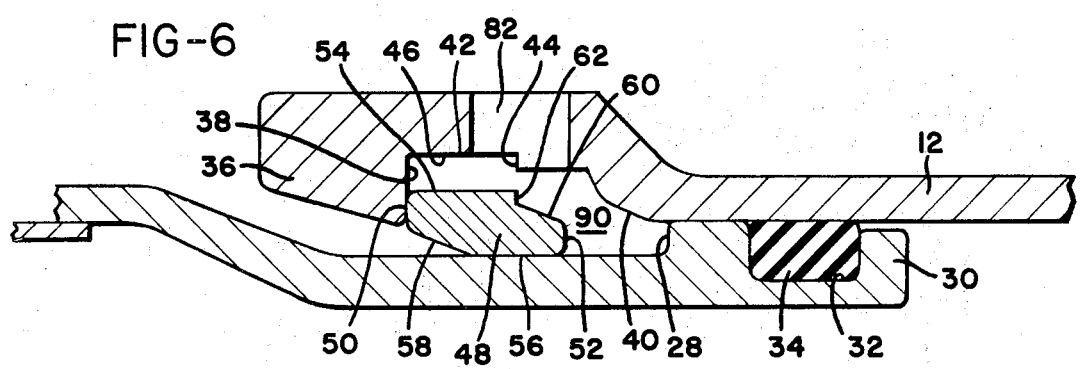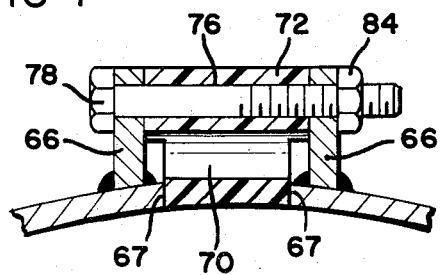

PIPE ASSEMBLY

BACKGROUND OF THE INVENTION

Pressurized pipe lines of the type typified by water lines, are subjected, as a result of internal pressure and change of direction or size of the pipe, to thrust forces which tend to separate the pipe sections from each other. In many instances such separation can be resisted by the use of thrust blocks.

Under certain circumstances, however, other factors, such as obstrucions and poor soil conditions, render the use of a thrust block impractical. Under these circumstances a harnessed joint will generally be used. Several types of harnessed joints are presently in use and certain features are common to practically all types. Thus, each will usually include a spigot ring having a groove containing a gasket which bears against the inner face of a bell ring and some means of tieing the bell and spigot rings together.

In a welded type harnessed joint, for example, a filler weld rod is inserted between the inner face of the bell and the outer face of the spigot after the spigot has been inserted into the bell and field welds made about the filler weld rod. In a clamped type harness joint, clamp bars are welded to the outer faces of both the bell and spigot rings and a harness ring having inwardly projecting flanges is assembled around the joint.

U.S. Pat. No. 3,177,019 describes a harness joint in which a split ring is positioned between the inner face of the bell ring and the outer face of the spigot to act as a key, bearing against an inwardly projecting nose on the bell and an outwardly projecting flange on the spigot to prevent separation of the pipe sections. In a variation of this joint a plurality of bolts are substituted for the split ring, the bolts being threaded through the bell after the spigot is inserted, to contact the outwardly projecting spigot flange and prevent separation of the affected pipe sections.

SUMMARY OF THE INVENTION

The present invention provides a harnessed type joint which provides superior resistance to thrust forces acting on the pipe assembly and yet is readily adapted for rapid assembly in the field with a minimum of skilled labor, A pipe assembly in accordance with the present invention includes a one piece bell ring having an inwardly projecting nose which defines a wall projecting inwardly of the bell towards the spigot. Spaced axially along the bell away from its end is a shoulder which slopes inwardly towards the spigot. Additionally, a plurality of regularly spaced openings are formed through the bell both for inspection purposes and, as will appear below, to facilitate grouting of the assembled pipe sections.

The spigot ring used in conjunction with the present invention may be of more or less conventional construction, including a pair of spaced, annularly shaped ribs defining a gasket receiving groove therebetween. However, the lock ring received between the outer face of the spigot and the inner face of the bell offers several advantageous features over prior art constructions.

Thus, in addition to inner and outer bearing walls which are adapted to contact the inwardly projecting wall of the bell and one of the outwardly projecting ribs on the spigot, the lock ring is provided with a stepped wall adjacent its outer surface which engages with a complementary stepped portion on the bell ring when the lock ring is in its expanded condition to seat the lock ring within the bell ring and resist displacement thereof during the assembly with a spigot end of an adjoining pipe section.

Under normal field conditions adjoining pipe sections may be deflected with respect to each other. It will be apparent that, with even a small deflection, if the pipe sections tend to separate there will be a line contact between the lock ring and the adjacent annular rib on the spigot. To avoid the concentration of stresses that would result from this condition, grout may be provided at the joint to, in effect, act as a cushion to distribute the load about the joint.

In accordance with the present invention provision is made for insuring an adequate accumulation of grout at this point by providing the bell ring, as noted above, with a sloped shoulder, which cooperates with a bevelled outer surface of the lock ring to define a grout receiving chamber of increased volume.

To insure that sufficient grout reaches this chamber the bell ring is provided with a series of openings around its periphery through the wall of the bell between the nose and the inwardly sloped shoulder. With this construction, it will be seen that when, as in normal practice, a diaper is positioned around the joint and filled with grout, the openings formed through the bell ring will serve as both venting holes and as openings for the entry of grout into the joint.

It will also be noted that the sloped shoulder of the bell ring not only serves to define a grout receiving chamber with the bevelled outer surface of the lock ring, but also assists the insertion of the gasket carrying spigot end into the bell. Thus, the flat, sloped surface of the shoulder assists in compressing the gasket as the spigot enters that part of the bell ring.

The lock ring is provided with an additional, inner bevelled surface extending from the bell ring towards the spigot ring. This facilitates assembly of the bell and spigot without damage to the gasket carried by the spigot, since the gasket, if it contacts the lock ring during assembly, will tend to slip smoothly along the above noted bevelled surface of the lock ring without catching and possibly being damaged.

Prior to positioning the lock ring in its final contracted position in the assembly, a spacer block is mounted in the bell end of the pipe section. The spacer is of T-shaped configuration, having a stem which extends through the slot in the bell ring and a head which is positioned outside of the bell. The stem of the spacer fills the gap between the ends of the lock ring, and the lower surface of the stem is bevelled to conform with the inner surfaces of the lock ring. The head of the spacer is longer and wider than the slot through the bell and projects outwardly from the bell a distance greater than do the lugs of the lock ring.

The stem of the spacer thus keeps the lock ring expanded and bridges the space between the ends thereof. This serves to guide the gasket carried by the spigot over the gap between the ends of the lock ring. The bevelled surface of the spacer stem, of course, prevents the gasket from being caught on the stem itself. On the other hand, by forming the head of the spacer as indicated, if the pipe section is, for example, rolled into place, the lugs are prevented from being pushed into the pipe or otherwise deformed as the pipe is being handled. Additionally, the head of the spacer is preferably provided with depressions running along either side thereof to facilitate grasping the spacer for its removal from the pipe after the spigot is inserted in the bell.

BRIEF DESCRIPTION OF THE DRAWINGS

FIG. 4 is an end view of a spacer used in the pipe joint;

FIG. 5 is a side view of the spacer of FIG. 4;

FIG. 6 is another view similar to FIG. 2 but showing another portion of the pipe assembly; and FIG. 7 is a cross-sectional view taken on line 7—7 of FIG. 1.

DESCRIPTION OF THE PREFERRED EMBODIMENTS

Figure 1:
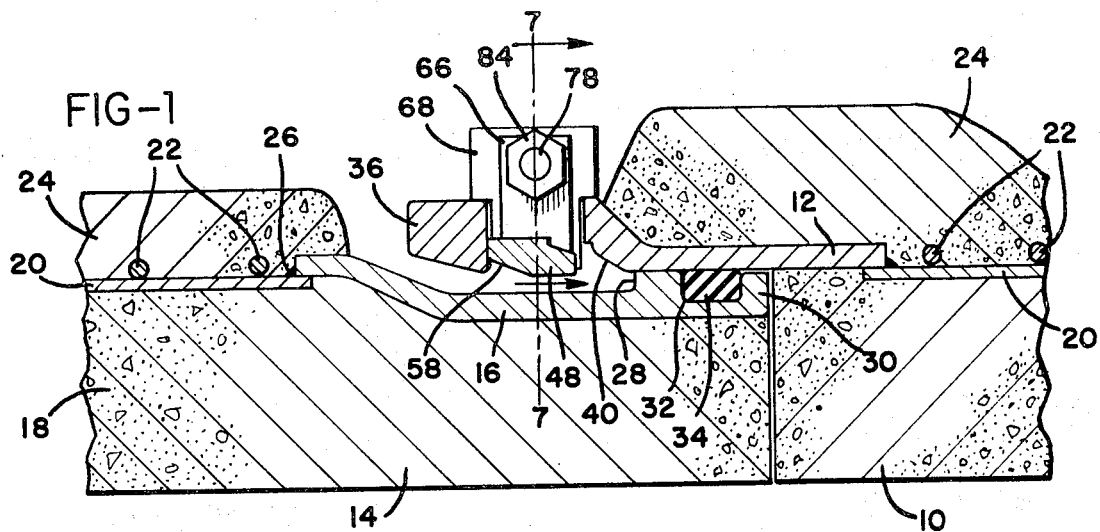
FIG. 1 is a cross sectional view through a portion of a pipe assembly taken along the axis of the pipe line with the lock ring in its expanded condition.
Figure 2:
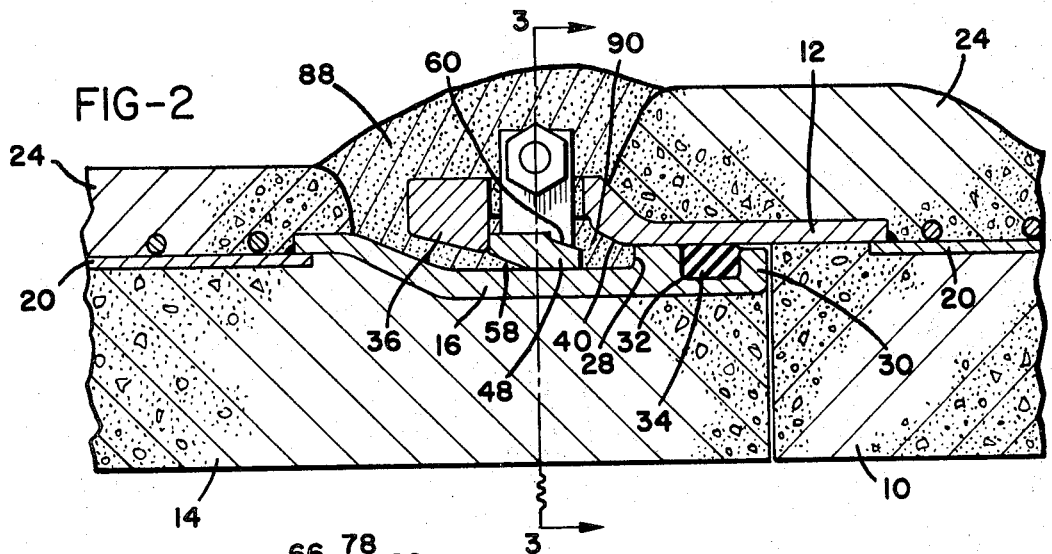
FIG. 2 is a view similar to FIG. 1 but showing the completed joint.

Turning initially to FIGS. 1, 2 and 6 of the drawings, it will be seen that a pipe assembly in accordance with the present invention includes a first pipe section 10 having a bell end including a one piece bell ring 12 and joined to a second pipe section 14 having a spigot end including a spigot ring 16 received within the bell ring.

Each of the pipe sections is shown here for purposes of illustration as being of the prestressed cylinder type, including a concrete core 18, a steel cylinder 20, prestressing wires 22 wound about the steel cylinder and a mortar coating 24. Of course, this specific type of pipe is shown merely for purposes of illustration and it will be apparent as the description proceeds that the present invention is equally adapted for use with other types of pipes.

With construction shown herein, however, it will be seen that the spigot ring 16 is welded to the steel cylinder, as at 26, and is provided with a pair of annular ribs 28 and 30. Ribs 28 and 30 define between them a groove 32 in which is received a gasket 34 contacting the opposing portion of the inner face of the bell ring 12.

Bell ring 12, as best seen in FIG. 6 of the drawings, includes a nose portion 36 defining an inwardly projecting nose wall 38. A sloped shoulder 40 is spaced axially of the bell ring from the inwardly projecting wall 38 and is connected thereto by a connecting wall 42. Connecting wall 42 is provided with a step 44 displaced axially from the inwardly projecting wall 38 and defining a radially outwardly offset section 46.

Positioned with the pipe assembly intermediate the inner face of the bell face and the outer face of the spigot ring is a split locking ring 48. Locking ring 48 has a first bearing wall 50 positioned opposite the bell nose wall 38 and a second bearing wall 52 positioned in opposition to the spigot annular rib 28. Locking ring 48 also includes an inner wall 56, an inner bevelled surface 58 extending from the inner wall 56 to the first bearing wall 50 and an outer bevelled surface 60 extending from the second bearing wall 52.

It will also be seen that an outer wall 54 of the locking ring is joined to the outer bevelled surface 60 by means of a stepped portion 62. It will be noted particularly from FIG. 6 of the drawings that the offset section 46 of the bell ring and the step 44 thereof are substantially the same size and shape as the outer wall 54 and step 64, respectively, of the locking ring 48.

Bell ring 12, as best seen in FIGS. 1, 2, 3 and 7 of the drawings, is provided with a slot 64, through which project radially outwardly extending lugs 66 attached to each end 67 of the split locking ring 48. In the expanded condition of the locking ring, as in FIGS. 1 and 7 of the drawings, ends 67 of the lock ring will be spaced from each other and positioned between ends 67 is the substantially T-shaped spacer 68.

Spacer 68, as best seen in FIGS. 4, 5 and 7 of the drawings, includes a stem portion 70 and a head portion 72. The bottom edge of the stem portion 70 is bevelled, as at 74, to match the inner bevelled surface 58 of the lock ring when the lock ring and spacer are assembled in the bell ring in the manner shown in FIG. 1 of the drawings.

The head 72 of the spacer is provided with an opening 76 therethrough which aligns with openings through the lugs 66 of the lock ring. A bolt or the like 78 may then be threaded through the opening 76 and the bolts 78 in the spacer to secure the spacer in position.

It will be noted that the stem of the spacer is approximately the same size as the slot 64 through the bell ring but that the head 68 of the spacer is wider than the slot and projects outwardly from the bell ring a distance greater than the lugs 66 when the locking ring is in its separated condition. It will also be noted from FIGS. 4 and 5 that the spacer may be provided with depressions 80 along each side of the head of the spacer to provide hand holds for removing the spacer from the pipe assembly.

Figure 3:
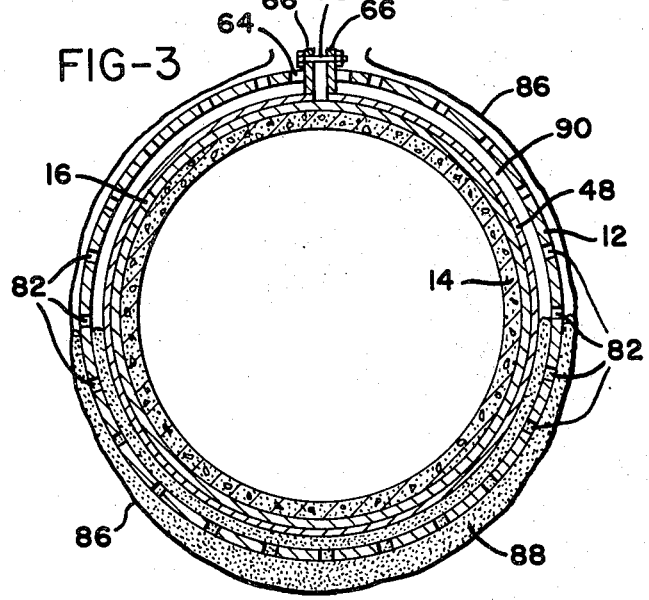
FIG. 3 is a cross sectional view of a partially assembled joint taken transversely of the pipe line.

Additionally, as best seen in FIG. 3 of the drawings, the bell ring is provided with a series of regularly spaced openings 82 extending through the connecting wall 42 of the bell ring into the joint. Each of the openings 82 should be spaced about the circumference of the bell ring on centers of from six to eighteen inches for use in the manner described below.

In assembling a joint in accordance with the present invention, the locking ring is positioned with the bell ring with its lugs 66 extending outwardly through the slot 64 in the bell ring, and the locking ring expanded so that its outer wall 54 engages the offset 46 on the bell ring and the steps 44 and 62 of the bell and locking ring are in engagement with each other.

The spacer 68 is positioned between the lugs 66 with its stem 70 received in the slot 64 and its bevelled surface 74 flush with the inner bevelled surface 58 of the locking ring. Due to the fact that the head of the spacer is wider than the slot 64 and projects outwardly from the bell ring beyond the lugs 66, the locking ring is protected from being pushed inside the bell or otherwise deformed when the pipe is being rolled on the ground as often happens at the installation site prior to assembly.

A gasket 34, which may be of the O-ring type, is then placed in the groove 32 on the spigot ring, the joint members lubricated with a vegetable soap or the like, and the spigot 16 of the pipe section 14 inserted into the bell ring 12 with the gasket 34 engaging the inner face thereof. As the spigot is positioned within the bell ring, the gasket 34 slides into position without danger of catching on the locking ring due to the bevelled surface 58 thereof and the position of the spacer stem 70 between the ends of the lock ring. In this regard the matching bevelled surface 74 on the spacer functions in the same manner.

It will also be noted that as the spigot is inserted in the bell any tendency for the locking ring to be displaced from its desired position is resisted by the seating of the locking ring portions 54 and 62 in the complementary portions 46 and 44 of the bell ring. Once the gasket clears the lock ring it may engage the sloped shoulder 40, which will assist in comprssing the gasket as the spigot passes this position.

The bolt 78 is then removed, allowing the spacer 68 to be removed from between the upstanding lugs 66. In this regard it will be noted that the depressions 80 in the spacer facilitate grasping the spacer manually for removal. The bolt 78 is then reinserted through the openings in the lugs 66 and the nut 84 threaded thereon to draw the lugs together and contract the split locking ring to the configuration shown in FIGS. 2 and 6 of the drawings.

While the locking ring is described as being contracted by means of the nut and bolt 84 and 78, it will be apparent that any convenient means for drawing the ends of the locking ring together will be suitable. For example, an over center latch might be used.

A conventional diaper 86 of cloth or other flexible material is clamped circumferentially to each of the pipe sections on opposite sides of the joint and grout 88 is poured into the diaper to form a mass of grout within the diaper about the joint. As grout is poured into the diaper from a point adjacent the top of the pipe joint, it will begin filling from the bottom upwards, as indicated in FIG. 3 of the drawings.

As it does, grout will pass through the openings 82 in the bell into the interior of the joint and particularly into the chamber 90 defined by the sloped shoulder 40, outer bevelled surface 60 and other opposing portions of the joint members to provide a cushion of grout at this position. Due to the sloped configuration of the shoulder 40 and bevelled outer surface 60 of the locking ring, a more than sufficient amount of grout is provided in the chamber to distribute the load, upon axial displacement of the sections, between opposing portions of the locking ring 48 and the upstanding ribs 28, even though, as will normally be the case, the joints sections are deflected.

Thus, the excessive stresses which would otherwise result from line contact between rib 28 and bearing wall 52 of the locking ring are avoided. At the same time, the provisions of the openings 82 at regularly spaced intervals about the bell ring insures that the chamber 90 is completely filled with grout to function in its intended manner.

From the above it will be apparent that the present invention provides a pipe assembly which may be rapidly assembled without the use of skilled labor and yet provides improved resistance to thrust forces tending to separate the joint components.

While the forms of apparatus herein described constitute preferred embodiments of the invention, it is to be understood that the invention is not limited to these precise forms of apparatus, and that changes may be made therein without departing from the scope of the invention.

What is claimed is:

1. A pipe assembly including a first pipe section having a bell end terminating in a bell ring, a second pipe section having a spigot end terminating in a spigot ring, and a split, circumferentially expandable and contractible lock ring positioned between an inner face of said bell ring and an outer face of said spigot ring comprising:
    a. a wall projecting inwardly from adjacent one end of said bell ring toward said spigot ring and terminating in spaced relationship thereto,
    b. an annular rib projecting outwardly of said spigot ring from adjacent an end thereof and terminating in spaced relationship to said bell ring a distance sufficient to clear said bell ring wall and said lock ring in its expanded condition when said spigot ring is inserted in said bell ring and said lock ring,
    c. means defining first and second bearing walls on said lock ring extending in opposed relationship to said bell ring wall and said annular rib, respectively,
    d. means defining a slot through said bell ring intermediate said inwardly projecting wall and said annular rib,
    e. a pair of spaced lugs projecting upwardly from each end of said split lock ring through said bell ring slot,
    f. a substantially T-shaped spacer having a stem portion and a head portion,
    g. said stem of said spacer being positioned in said slot between said lock ring lugs,
    h. said head of said spacer being positioned outwardly of said bell ring,
    i. an annular gasket positioned about said spigot end of said second pipe section and projecting radially outwardly therefrom in its uncompressed state a distance greater than said annular rib projects outwardly of said spigot ring,
    j. means defining an inner annular surface on said lock ring, and
    k. means defining an inner surface on the base of said stem of said spacer substantially coincident with said annular surface of said lock ring when said spacer is positioned between said lugs of said lock ring to provide a substantially continuous surface and prevent damage to said gasket as said spigot end is inserted in said bell end and said lock ring.
2. The assembly of claim 1 wherein:
    a. said head of said spacer is wider than said slot.
3. The assembly of claim 1 wherein:
    a. said head of said spacer projects outwardly of said bell ring beyond said lock ring lugs.
4. The assembly of claim 1 further comprising:
    a. means defining depressed portions extending along opposite sides of said head to facilitate manual engagement therewith.
5. The assembly of claim 1 wherein:
    a. said head of said spacer is wider than said slot,
    b. said head of said spacer projects outwardly of said bell ring beyond said lock ring lugs,
    c. means are provided defining depressed portions extending along opposite sides of said head, and
    d. said base of said stem is curved matching said annular surface of said lock ring.
6. A pipe assembly including a first pipe section having a bell end terminating in a bell ring, a second pipe section having a spigot end terminating in a spigot ring, and a split, circumferentially expandable and contractible lock ring positioned between an inner face of said bell ring and an outer face of said spigot ring comprising:
  a. a nose portion projecting inwardly from an end of said bell ring toward said spigot ring and defining an inwardly projecting nose wall,
  b. first and second spaced annular ribs projecting radially outwardly of said spigot ring, terminating spaced from said bell ring a distance sufficient to clear said nose and said lock ring when said spigot ring is inserted into said bell ring and said lock ring, and defining a groove therebetween,
  c. a gasket seated in said groove and contacting said bell ring,
  d. a sloped shoulder on said bell ring spaced from said nose wall and sloped inwardly toward said spigot ring and away from said nose wall,
  e. a connecting wall extending between said nose wall and said sloped shoulder in spaced relationship to said spigot ring,
  f. said connecting wall having a step therein defining a radially outwardly offset section of said connecting wall between said step and said nose wall,
  g. means defining a plurality of openings through said bell ring at said connecting wall thereof,
  h. means defining a slot through said bell ring at said connecting wall thereof,
  i. spaced parallel inner and outer walls on said lock ring,
  j. a pair of spaced lugs projecting outwardly from said outer wall of said lock ring and received in said slot,
  k. an inner bevelled surface extending outwardly from said inner wall of said lock ring toward said outer wall thereof,
  l. a first bearing wall extending from said inner bevelled surface of said lock ring to said outer wall thereof in opposition to said nose wall,
  m. a second bearing wall extending outwardly from said inner wall of said lock ring in opposition to said first annular rib,
  n. an outer bevelled surface extending outwardly from said second bearing wall toward said outer wall of said lock ring,
  o. a stepped wall joining said outer bevelled surface and said outer wall of said lock ring,
  p. said outer wall and said stepped wall of said lock ring being approximately the same size as said offset section and said step, respectively, of said connecting wall of said bell ring for mating engagement therewith when said lock ring is in its expanded condition, and
  q. a hardenable material cast in said assembly and extending between said second bearing surface and said first annular rib, said outer bevelled surface of said lock ring and opposed portions of said bell ring, and said outer wall of said lock ring and said connecting wall.

7. A pipe assembly including a first pipe section having a bell end terminating in a bell ring, a second pipe section having a spigot end terminating in a spigot ring, and a split, circumferentially expandable and contractible lock ring positioned between an inner face of said bell ring and an outer face of said spigot ring comprising:
  a. a nose portion projecting inwardly from an end of said bell ring toward said spigot ring and defining an inwardly projecting nose wall,
  b. first and second spaced annular ribs projecting radially outwardly of said spigot ring, terminating spaced from said bell ring a distance sufficient to clear said nose and said lock ring when said spigot ring is inserted into said bell ring and said lock ring, and defining a groove therebetween,
  c. a gasket seated in said groove and contacting said bell ring,
  d. a sloped shoulder on said bell ring spaced from said nose wall and sloped inwardly toward said spigot ring and away from said nose wall,
  e. a connecting wall extending between said nose wall and said sloped shoulder in spaced relationship to said spigot ring,
  f. said connecting wall having a step therein defining a radially outwardly offset section of said connecting wall between said step and said nose wall,
  g. means defining a plurality of openings through said bell ring at said connecting wall thereof with said openings spaced from each other approximately 6 – 18 inches,
  h. means defining a slot through said bell ring at said connecting wall thereof,
  i. spaced parallel inner and outer walls on said lock ring,
  j. a pair of spaced lugs projecting outwardly from said outer wall of said lock ring and received in said slot,
  k. an inner bevelled surface extending outwardly from said inner wall of said lock ring toward said outer wall thereof,
  l. a first bearing wall extending from said inner bevelled surface of said lock ring to said outer wall thereof in opposition to said nose wall,
  m. a second bearing wall extending outwardly from said inner wall of said lock ring in opposition to said first annular rib,
  n. an outer bevelled surface extending outwardly from said second bearing wall toward said outer wall of said lock ring,
  o. a stepped wall joining said outer bevelled surface and said outer wall of said lock ring,
  p. said outer wall and said stepped wall of said lock ring being approximately the same size as said offset section and said step, respectively, of said connecting wall of said bell ring for mating engagement therewith when said lock ring is in its expanded condition,
  q. a substantially T-shaped spacer positioned between said spaced lugs,
  r. the stem of said spacer being received in said slot in said bell ring and the head of said spacer being positioned outwardly thereof,
  s. said head being wider than said slot and projecting outwardly of said bell ring further than said lugs, and
  t. means defining manually engageable depressions extending along opposite sides of said head of said spacer.

8. A pipe assembly including a first concrete pipe section having a bell end terminating in a bell ring, a second concrete pipe section having a spigot end terminating in a spigot ring, and a split, circumferentially expandable and contractible lock ring positioned between an innerface of said bell ring and an outer face of said spigot ring comprising:

a. a nose portion projecting inwardly from an axial end of said bell ring and defining a first, inwardly projecting wall,
b. means defining a sloped shoulder on said bell ring spaced axially inwardly of said bell ring from said first wall,
c. a connecting wall extending between said first wall and said sloped shoulder in spaced relationship to said spigot ring,
d. said connecting wall having a step therein defining a radially outwardly offset section of said connecting wall displaced radially outwardly from said spigot ring a distance greater than the remainder of said connecting wall,
e. means defining a stepped portion on said lock ring complementary to and engageable with said bell ring step when said lock ring is in its expanded condition to lock in said bell ring offset section said lock ring against displacement as said spigot ring is inserted into said bell ring and lock ring,
f. an annular rib projecting outwardly of said spigot ring adjacent to but spaced inwardly from an axial end of said spigot ring and terminating in spaced relationship to said bell ring a distance sufficient to clear said first wall and said lock ring in its expanded condition when said spigot ring is inserted in said bell ring and said lock ring,
g. means defining a gasket receiving groove displaced axially outwardly of said annular rib,
h. a compressible gasket received in said groove and in its uncompressed state projecting radially outwardly of said spigot ring further than said annular rib,
i. means defining an outer bevelled surface on said lock ring extending from said stepped portion thereon in opposition to said sloped shoulder,
j. means defining an inner bevelled surface on said lock ring in spaced, substantially parallel relationship to said outer bevelled surface,
k. a first bearing wall on said lock ring extending from said outer bevelled surface inwardly toward said spigot ring in opposition to a radial surface of said annular rib,
l. a second bearing wall on said lock ring extending from said outer bevelled surface in opposition to said first wall on said nose portion,
m. means defining an opening through said bell ring intermediate said sloped shoulder and said first wall of said nose portion, and
n. radially outwardly extending lugs attached to ends of said split lock ring and extending through said opening in said bell ring.

* * * * *